United States Patent
Greggs (10) Patent No.: US 10,053,025 B2
(45) Date of Patent: Aug. 21, 2018

(54) HITCH COVER ASSEMBLY

(71) Applicant: Nissan North America, Inc., Franklin, TN (US)

(72) Inventor: Alan Greggs, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 397 days.

(21) Appl. No.: 14/819,065

(22) Filed: Aug. 5, 2015

(65) Prior Publication Data

US 2017/0036617 A1    Feb. 9, 2017

(51) Int. Cl.
| | |
|---|---|
| *B60D 1/60* | (2006.01) |
| *B62D 25/20* | (2006.01) |
| *B60R 13/01* | (2006.01) |
| *B60P 1/44* | (2006.01) |
| *B60P 3/40* | (2006.01) |
| *B62D 25/24* | (2006.01) |

(52) U.S. Cl.
CPC ............ *B60R 13/01* (2013.01); *B60P 1/44* (2013.01); *B60P 3/40* (2013.01); *B60R 2013/016* (2013.01); *B62D 25/24* (2013.01)

(58) Field of Classification Search
CPC ........ B62D 25/209; B62D 25/24; B60D 1/60; B60D 1/605; B60D 1/583; B60D 1/44; B60D 3/40; B60R 2013/016; B60R 13/01; B60R 13/016; F16B 21/075; F16B 21/076; F16B 21/078
USPC ........... 280/507, 901; 296/39.2, 97.22, 1.06; 138/89; 248/27.3, 346.04; 411/517, 529; 40/663; 49/57, 62
See application file for complete search history.

(56) References Cited

U.S. PATENT DOCUMENTS

| | | | | |
|---|---|---|---|---|
| 1,400,155 | A * | 12/1921 | Greenburg | G09F 7/18 220/3.6 |
| 1,483,218 | A * | 2/1924 | Fahnestock | H02G 3/083 16/109 |
| 2,156,003 | A * | 4/1939 | Tinnerman | G09F 7/18 174/153 R |
| 2,497,827 | A * | 2/1950 | Trafton | B62D 25/24 220/324 |
| 2,636,640 | A * | 4/1953 | Bedford, Jr. | B62D 25/24 220/782 |
| 3,620,401 | A * | 11/1971 | Lund | F21V 21/04 220/3.6 |
| 3,944,107 | A * | 3/1976 | Wallace | B62D 25/24 220/323 |
| 5,150,803 | A * | 9/1992 | Cartellone | A47J 31/4407 126/273 R |

(Continued)

*Primary Examiner* — Anne Marie M Boehler (57) ABSTRACT

A hitch cover assembly includes a ring member, a first clip, a second clip and a cover member. The ring member defines a ring opening and has an axially extending wall with a first end and a second end. The first clip member has a body portion with a fixed end attached to the axially extending wall proximate to the second end, and a distal end spaced axially from the fixed end and spaced radially from the axially extending wall. The second clip member has a body portion with a fixed end attached to the axially extending wall proximate the second end, and a distal end spaced axially from the fixed end and oriented to face inward toward a center of the axially extending wall. The cover member is configured to selectively attach to the ring member to overlay the ring opening.

22 Claims, 9 Drawing Sheets

(56) References Cited

U.S. PATENT DOCUMENTS

| | | | |
|---|---|---|---|
| 6,860,758 B1 * | 3/2005 | Kiely | H01R 4/363 174/652 |
| 7,708,489 B2 * | 5/2010 | Trotter | A47C 3/18 403/194 |
| 8,814,254 B1 * | 8/2014 | Peffley | B62D 25/209 296/183.1 |
| 2003/0094771 A1 * | 5/2003 | Stratman | B62D 25/24 277/628 |
| 2008/0238035 A1 * | 10/2008 | Stutts | B60D 1/36 280/477 |
| 2009/0174213 A1 * | 7/2009 | Robertson | B62D 25/24 296/70 |
| 2011/0197405 A1 * | 8/2011 | Kato | F16B 21/065 24/530 |
| 2014/0015225 A1 * | 1/2014 | Corless | B60D 1/605 280/507 |
| 2014/0070518 A1 * | 3/2014 | Sarajian | B60D 1/605 280/507 |

* cited by examiner

HITCH COVER ASSEMBLY

BACKGROUND

Field of the Invention

The present invention generally relates to a hitch cover assembly. More specifically, the present invention relates to a hitch cover assembly that covers the hitch members aligned with openings in a cargo bed of a pickup truck.

Background Information

The cover prevents objects placed in the cargo bed of the pickup truck from entering the openings and from contacting the hitch elements. The covers are generally removable to allow access to the hitch elements.

SUMMARY

It has been discovered that to improve hitch cover appearance and performance, and reduce costs, a versatile hitch cover is necessary. The hitch cover attaches to the openings in the bed of the truck and accounts for the variability in opening sizes.

In view of the state of the known technology, one aspect of the present disclosure is to provide a hitch cover assembly including a ring member, a first clip, a second clip and a cover member. The ring member defines a ring opening and has an axially extending wall with a first end and a second end. The first clip member has a body portion with a fixed end attached to the axially extending wall proximate to the second end, and a distal end spaced axially from the fixed end and spaced radially from the axially extending wall. The second clip member has a body portion with a fixed end attached to the axially extending wall proximate the second end, and a distal end spaced axially from the fixed end and oriented to face inward toward a center of the axially extending wall. The cover member is configured to selectively attach to the ring member to overlay the ring opening.

Another aspect of the present disclosure is to provide a vehicle body structure, including a cargo bed, a hitch member, a hitch cover assembly, and a cover member. The cargo bed has a cargo bed floor, the cargo bed floor having a first side, a second side opposite the first side, and an inner peripheral edge defining a hitch opening extending from the first side to the second side. The hitch member is aligned with the hitch opening. The hitch cover assembly comprises a ring member, a first clip and a second clip. The ring member defines a ring opening and is configured to attach to the cargo bed floor with the ring opening aligned with the hitch opening. The ring member includes an axial portion disposed in the hitch opening, the axial portion including an axially extending wall with a first end positioned adjacent the first side of the cargo bed floor and a second end positioned below the second side of the cargo bed floor. The first clip has a body portion with a fixed end attached to the axially extending wall proximate the second end, and a distal end spaced radially from the axially extending wall, the distal end of the first clip being positioned within the hitch opening and contacting the inner peripheral edge of the cargo bed floor to apply a outward radially directed force to the inner peripheral edge. The second clip has a body portion with a fixed end attached to the axially extending wall proximate the second end, and a distal end spaced axially from the fixed end and oriented to face inward toward a center of the axially extending wall, the distal end of the second clip contacting the second side of the cargo bed floor to apply an axially directed force toward the first end of the axially extending wall. The cover member is configured to selectively attach to the ring member to overlay the ring opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
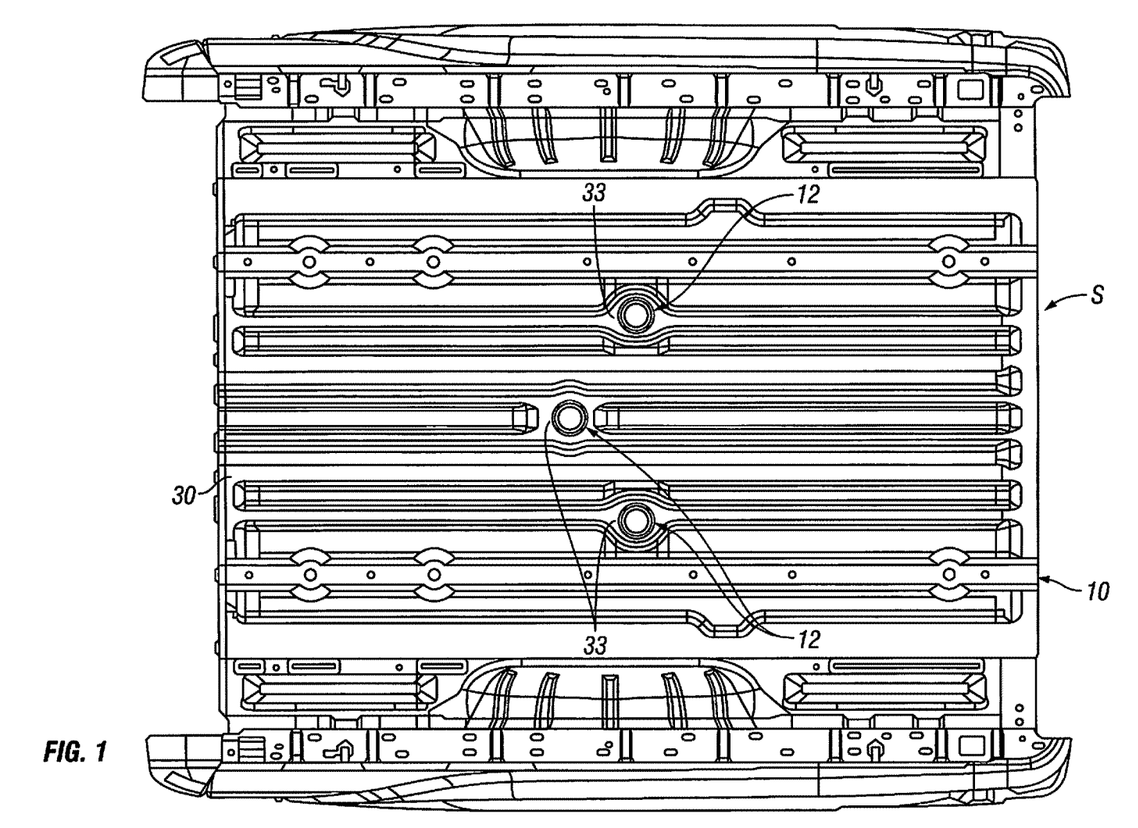
FIG. 1 is a top plan view of a cargo bed including the hitch cover assembly according to one embodiment.
Figure 2:
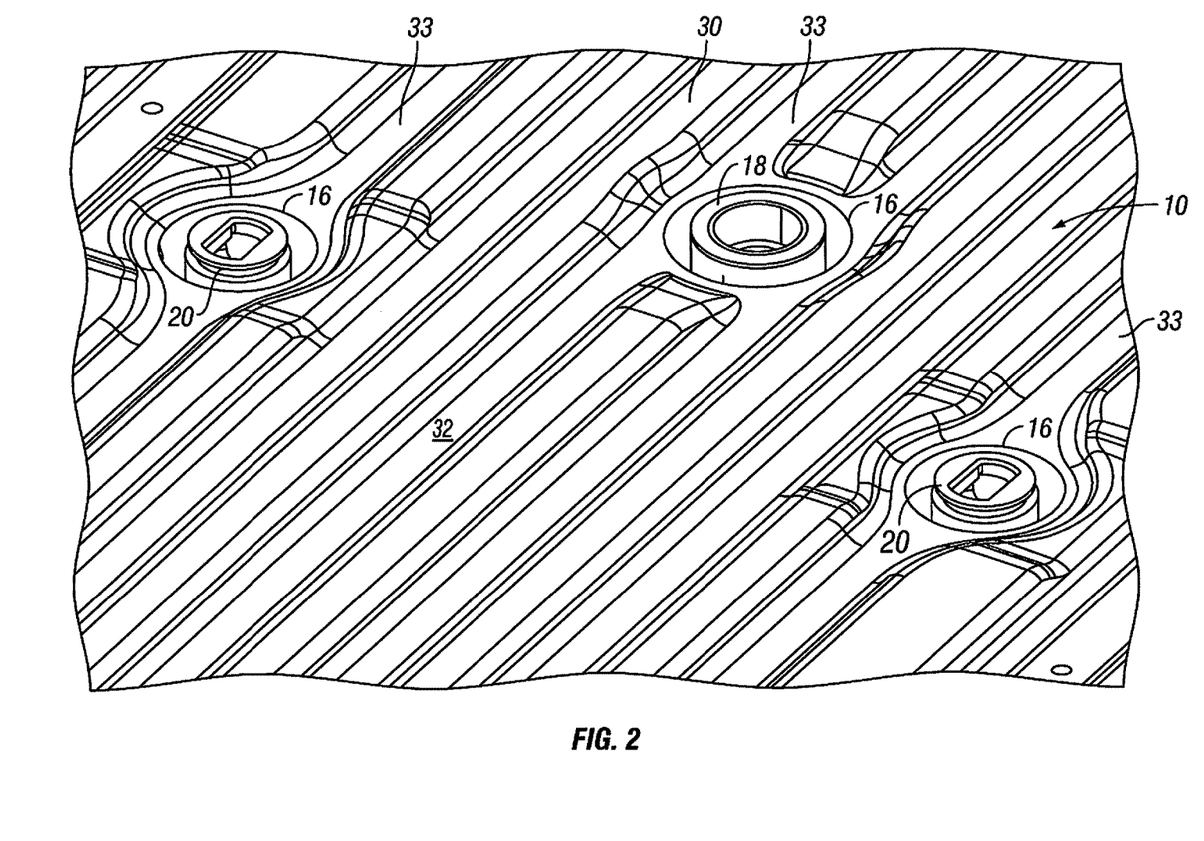
FIG. 2 is a top perspective view of the cargo bed with the hitch cover assembly of FIG. 1 removed.
Figure 3:
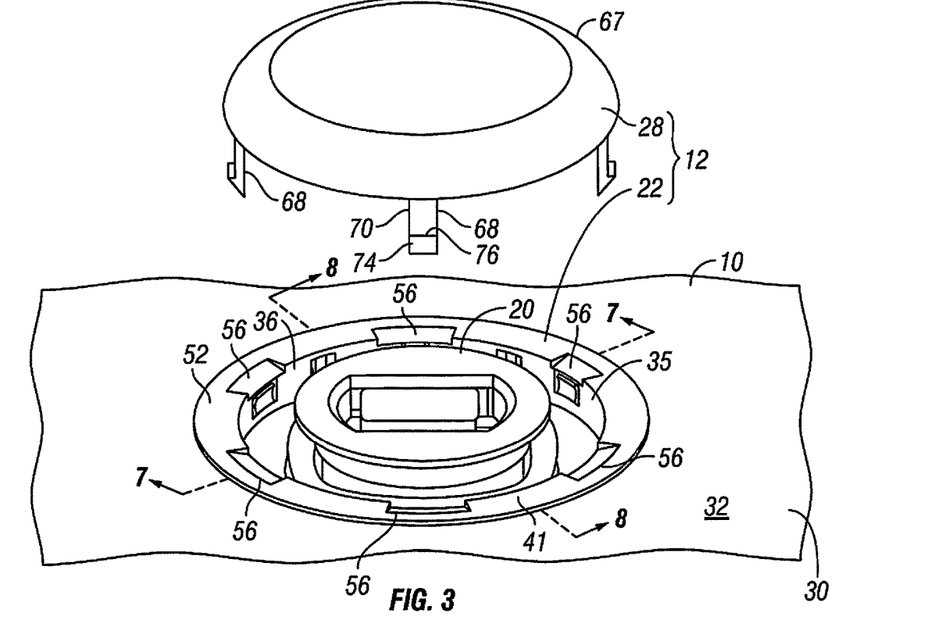
FIG. 3 is an enlarged view of the truck bed of FIG. 1 with the cover member removed from the hitch cover assembly.
Figure 4:
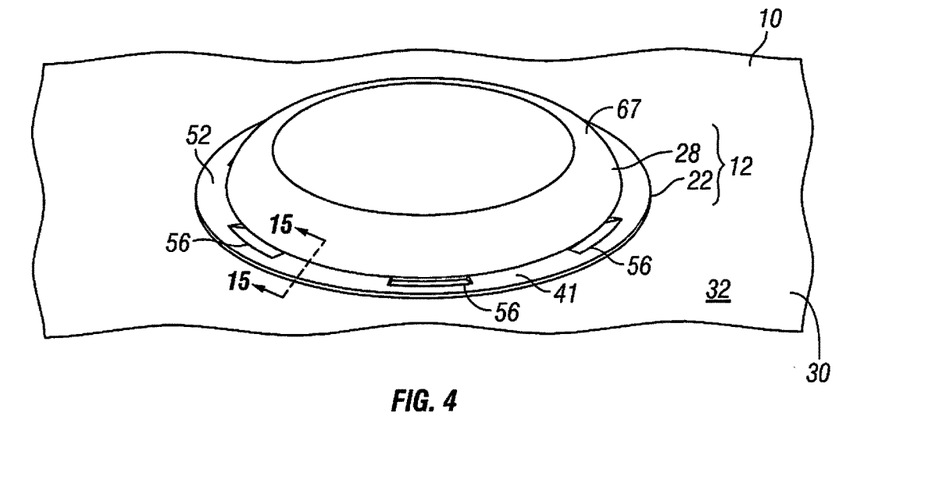
FIG. 4 is an enlarged view of the truck bed of FIG. 1 with the cover member attached to the hitch cover assembly.

Referring initially to FIGS. 1, 3 and 4, a hitch cover assembly 12 is illustrated in accordance with a first embodiment. The hitch cover assembly 12 is preferably a plastic molded device, but can be any formed from any suitable material. In one embodiment shown in FIG. 2, a cargo bed 10 of a pickup truck includes three hitch openings 16 for a hitch attachment or hitch member 18 and chain attachments 20. The hitch cover assembly 12 is capable of covering the hitch openings 16 to prevent objects from entering the hitch openings 16, and protect the hitch member 18 and the chain attachments 20 from being contacted by the objects put in the cargo bed 10 of the pickup truck.

Figure 5:
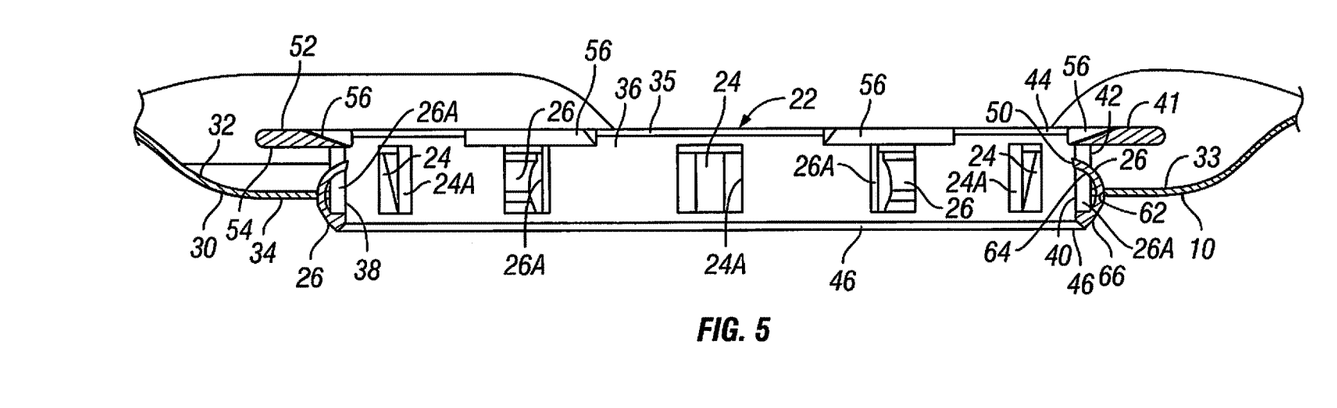
FIG. 5 is a side view in section of a ring member of the hitch cover assembly being inserted into the opening in the truck bed.
Figure 7:
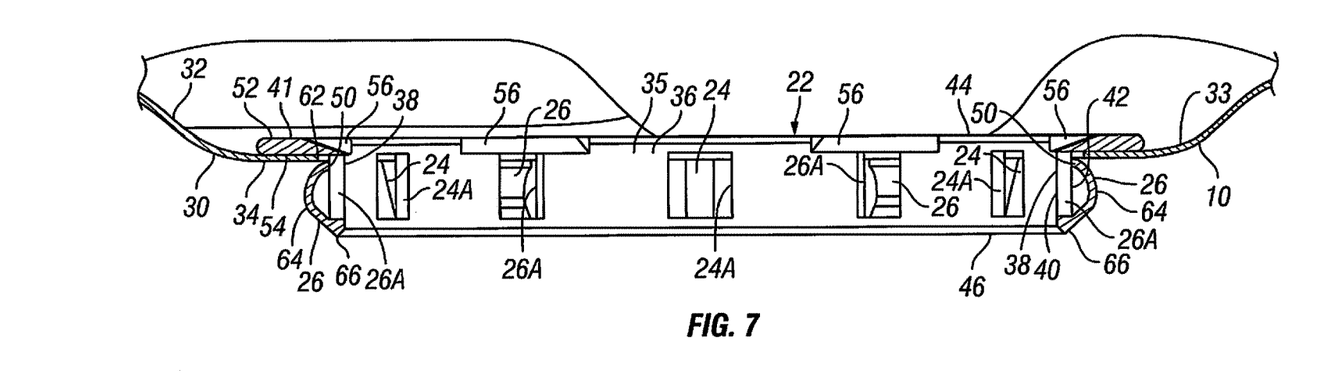
FIG. 7 is side view in section taken along the lines 7-7 in FIG. 3.

Accordingly, the hitch cover assembly 12 is disposed or is part of a vehicle body structure S. In one embodiment, the vehicle body structure S includes the cargo bed 10 of the pickup truck, the hitch member 18, the chain attachments 20, and the hitch cover assembly 12. The cargo bed 10 includes a cargo bed floor 30 with a first side 32, a second side 34 opposite the first side 32, and an inner peripheral edge 62 defining a hitch opening 16 extending from the first side 32 to the second side 34. As shown in FIG. 1, the cargo bed 10 can include a plurality of hitch openings 16 for various elements of a hitch or other structure. Since each of the openings 16 is substantially similar, only one hitch opening 16 will be described herein; however, the description of the one hitch opening 16 can be applied to each of the hitch openings 16 in the cargo bed 10. As shown in FIGS. 1, 5 and 7, the cargo bed floor 30 defines a recess 33, with the hitch opening 16 disposed in the recess 33.

As shown in FIGS. 3-7, the hitch cover assembly 12 is aligned with the hitch opening 16, and includes a ring member 22, a plurality of first clip members 24, a plurality of second clip members 26 and a cover member 28. The ring member 22 is generally circular and defines a ring opening 35 to enable the hitch element 18 to be accessible therethough. The ring member 22 has an axial portion 36 with an axially extending wall 38 and a radial portion 41 extending from the axially extending wall 38. The axially extending wall 38 generally forms a circle or ring and has an inner (first) surface 40 and an outer (second) surface 42. The axially extending wall 38 includes a first end 44 and a second end 46 and defines a plurality of first clip openings 24A and a plurality of second clip openings 26A between the first and second ends 44 and 46. Each of the first and second clip openings 24A and 26A extends through the axially extending wall 38 from the outer surface 42 to the inner surface 40. The first clip openings 24A are aligned with the first clip members 24, such that a distal free end 48 of each of the first clip members 24 is positionable within the corresponding first clip opening 24A, and the second clip openings 26A are aligned with the second clip members 26, such that a distal free end 50 of each of the second clip members 26 is positionable within the corresponding second clip opening 26A. The axial portion 36 can be disposed in the hitch opening 16, with the first end 44 of the axially extending wall 38 positioned adjacent the first side 32 of the cargo bed floor 30 and the second end 46 positioned below the second side 34 of the cargo bed floor 30.

As shown in FIGS. 3-7, the radial portion 41 is generally circular and includes an upwardly (first) facing surface 52 and a downwardly (second) facing surface 54. The radial portion 41 extends radially outward and generally perpendicularly from the first end 44 of the axially extending wall 38, such that the downwardly facing surface 54 extends along or adjacent the first side 32 of the cargo bed floor 30. Accordingly, the radial portion 41 can support and position the ring member 22 in the hitch opening 16 in the cargo bed floor 30.

Figure 6:
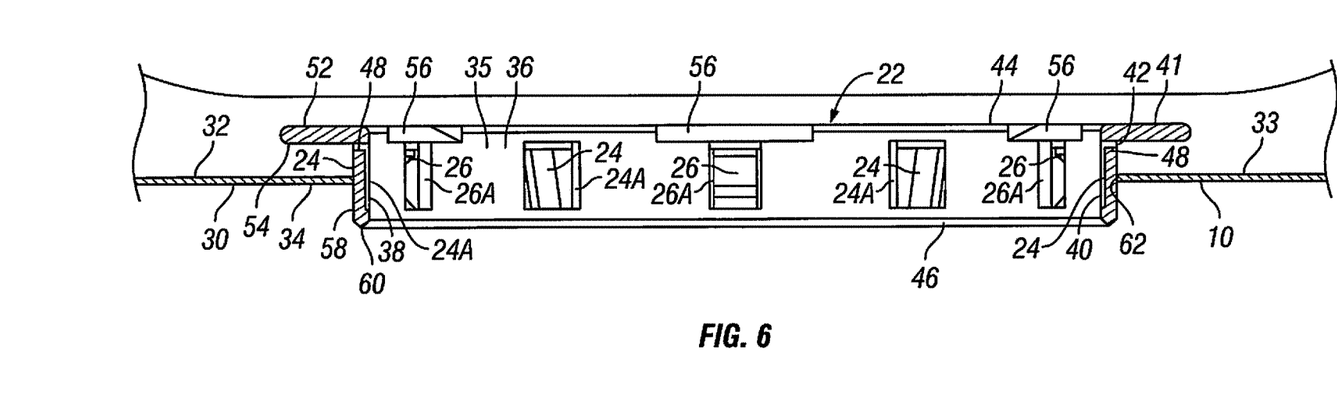
FIG. 6 is a side view in section of the ring member of the hitch cover assembly being inserted into the opening in the truck bed.
Figure 8:
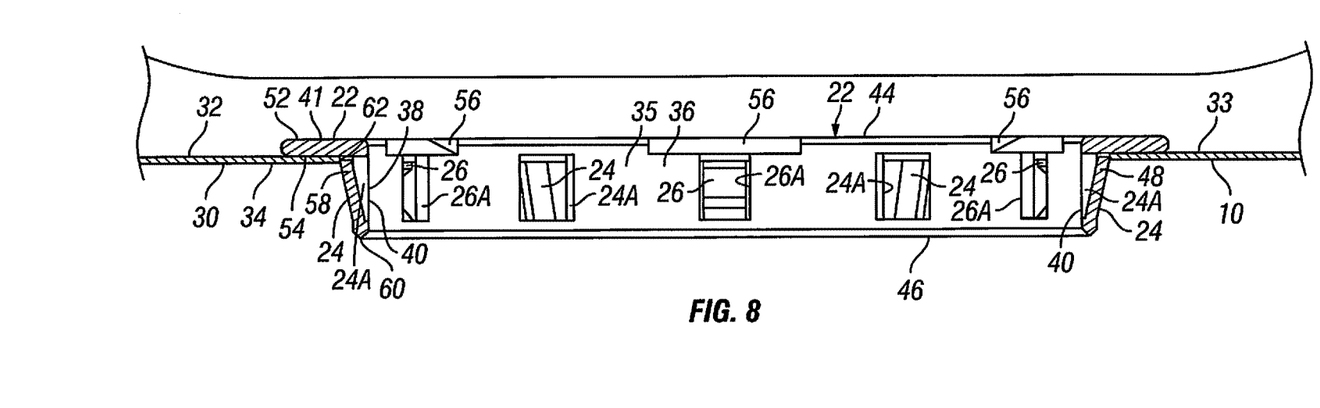
FIG. 8 is side view in section taken along the lines 8-8 in FIG. 3.

As shown in FIGS. 3-7, the first clip member 24 is one of a plurality of first clip members 24. Each of the first clip members 24 has a body portion 58 with a fixed end 60 attached to the axially extending wall 38 proximate to the second end 46, and the distal free end 48 is spaced axially from the fixed end 60 and spaced radially from the axially extending wall 38 in its resting state. The first clip member 24 can be substantially planar or straight and be integral or unitary with the axially extending wall 38. As shown in FIGS. 6 and 8, the first clip member 24 is biased outwardly due to the construction thereof. Therefore, as the ring member 22 is inserted into the opening 16 in the cargo bed floor 30, the first clip member 24 is forced inwardly by the peripheral edge (or surface) 62 of the cargo bed floor 30. As the radial portion 41 comes to rest on the cargo bed floor 30 (FIG. 8) the first clip member 24 engages the inner peripheral edge 62 of the bed floor 30. Thus, the distal free end 48 of the first clip member 24 is positioned within the hitch opening 16 and contacts the inner peripheral edge 62 of the cargo bed floor 30 to apply an outward radially directed force to the inner peripheral edge 62. This configuration enables the hitch cover assembly 12 to tightly fit within openings disposed in panels, such as cargo bed floors, having various widths or thicknesses.

Figure 12:
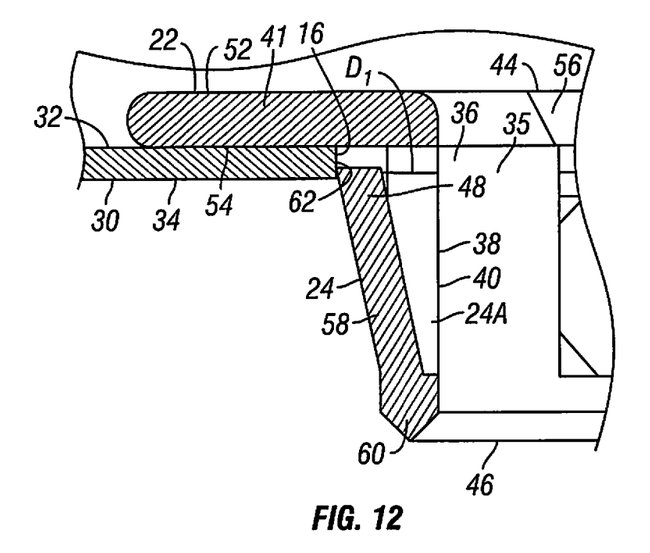
FIG. 12 is an enlarged view of the clip member shown in FIG. 8 in a large opening in the truck bed.
Figure 13:
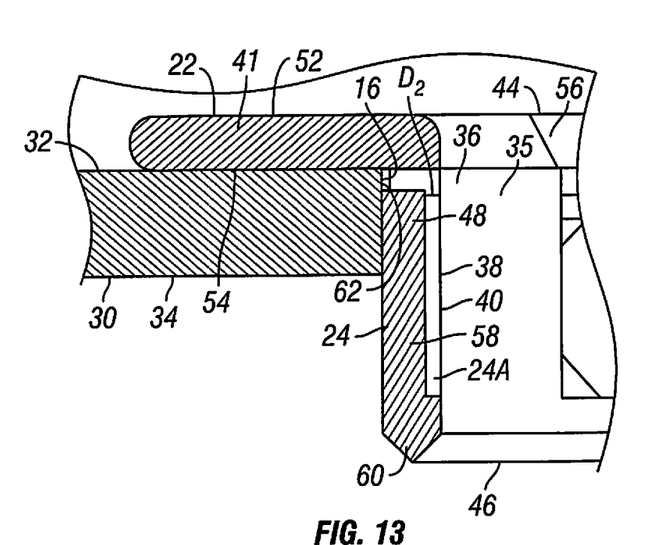
FIG. 13 is an enlarged view of the clip member shown in FIG. 8 in a small opening in the truck bed.
Figure 14:
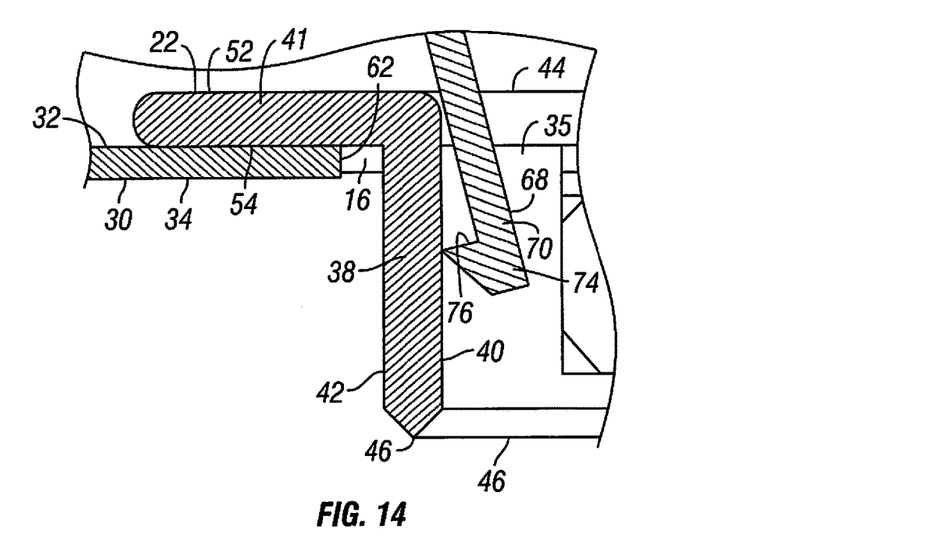
FIG. 14 is an enlarged view of the ring member with the cover member being inserted into the opening of the ring member.
Figure 15:
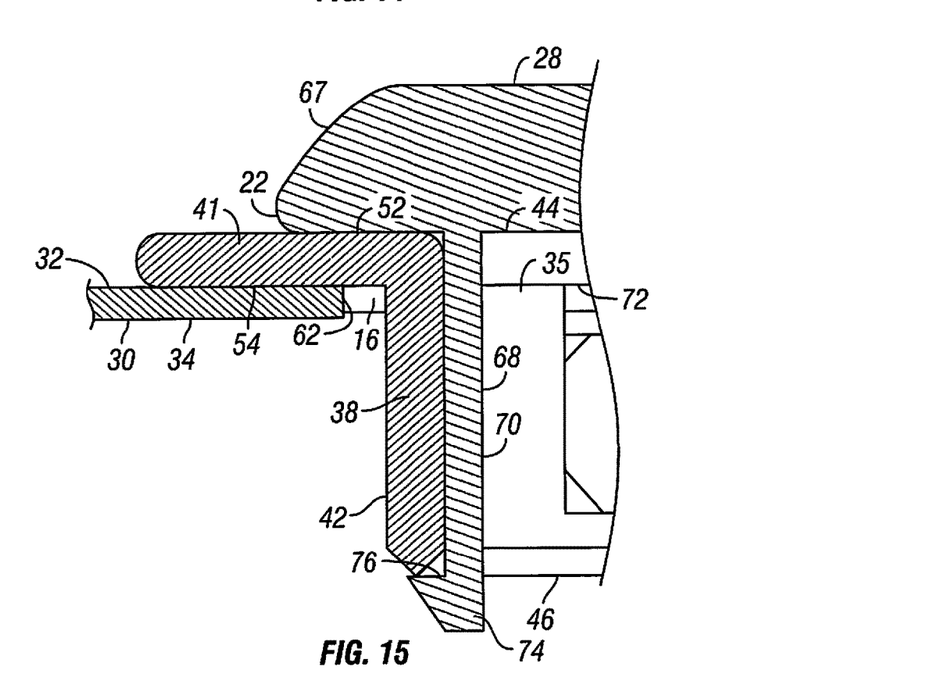
FIG. 15 is an enlarged view of the ring member shown in FIG. 14 with the cover member engaged with the ring member.

Thus, as shown in FIGS. 12 and 13, when the opening 16 is relatively large, the first clip member 24 contacts the inner peripheral edge 62 of the opening 16 and is spaced a first distance $D_1$ from the inner surface 40 of axially extending wall 38. However, when the opening 16 is relatively small the first clip member 24 contacts the inner peripheral edge 62 of the cargo bed floor 30 and is spaced a second distance $D_2$ from the inner surface 40 of the axially extending wall 38, the second distance $D_2$ being less than the first distance $D_1$. Accordingly, the first clip member 24 enables the hitch cover assembly 12 to fit in relatively large and relatively small openings, so as to reduce or eliminate lateral movement in various different sized openings.

As shown in FIGS. 3-7, the second clip member 26 is one of a plurality of second clip members 26. Each of the second clip members 26 has a body portion 64 with a fixed end 66 attached to the axially extending wall 38 proximate the second end 46, and the distal free end 50 is spaced axially from the fixed end 66 and oriented to face substantially inwardly toward a center of the axially extending wall 38. The second clip member 26 can have an arcuate shape and be integral or unitary with the axially extending wall 38. As shown in FIGS. 5 and 7, the second clip member 26 is biased outwardly and upwardly due to the construction thereof. Therefore, as the ring member 22 is inserted into the opening 16 in the cargo bed floor 30, the second clip member 26 is forced inwardly by the peripheral edge 62 of the opening 16. As the radial portion 41 comes to rest on the cargo bed floor 30 (FIG. 6) the distal free end 50 of the second clip member 26 contacts the second side 34 of the cargo bed floor 30 to apply an axially directed force toward the first end 44 of the axially extending wall 38. This configuration enables the hitch cover assembly 12 to tightly fit within openings disposed in panels, such as cargo bed floors, having various widths or thicknesses.

Figure 10:
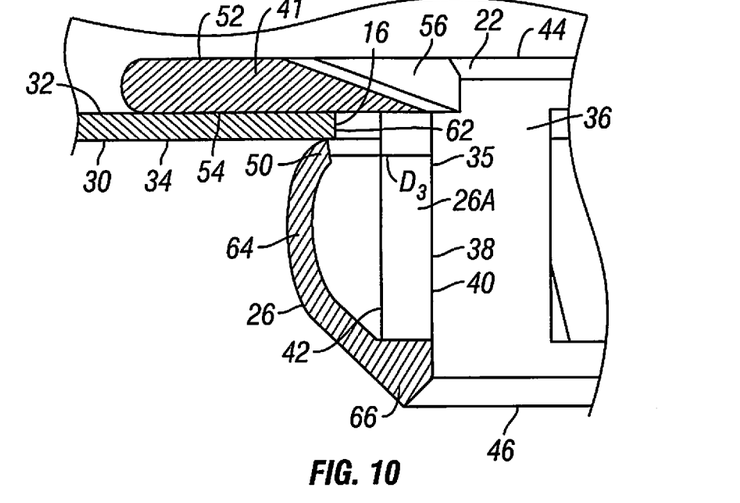
FIG. 10 is an enlarged view of the clip member shown in FIG. 7 in a large opening in the truck bed.
Figure 11:
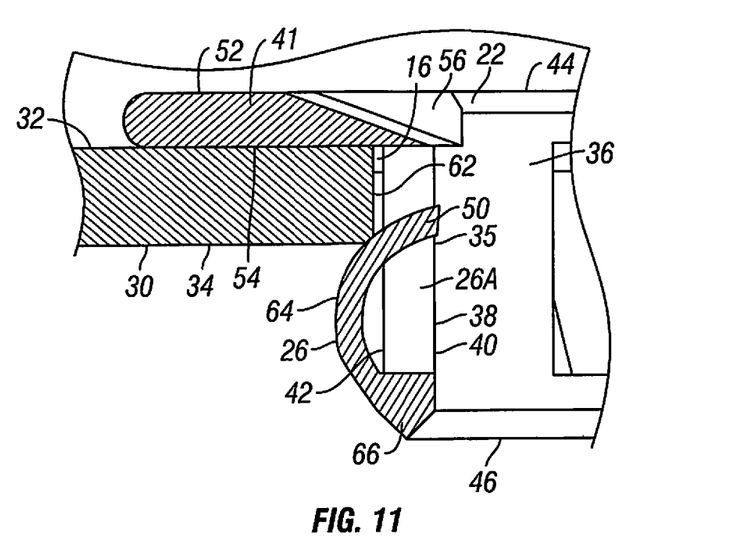
FIG. 11 is an enlarged view of the clip member shown in FIG. 7 in a small opening in the truck bed.

Thus, as shown in FIGS. 10 and 11, when the opening 16 is relatively large, the second clip member 26 contacts the second side 34 of the cargo bed floor 30 and the distal free end 50 of the second clip member 26 is spaced a third distance $D_3$ from the inner surface 40 of the axially extending wall 38. However, when the opening 16 is relatively small, the second clip member 26 contacts the second side 34 of the cargo bed floor 30 and the distal free end 50 of the second clip member 26 is spaced a fourth distance (not shown) from the inner surface 40 of the axially extending wall 38, the fourth distance being less than the third distance $D_3$, or the distal free end 50 of the second clip member 26 can be spaced inward from the inner surface 40 of the axially extending wall 38. Moreover, the second clip member 26 contacts the second side 34 of the cargo bed floor 30 to apply an axially directed force toward the first end 44 of the axially extending wall 38. However, when the opening 16 is relatively small, due to the arcuate configuration of the second clip member 26, the second clip member 26 still contacts the second side 34 of the cargo bed floor 30. The distal free end 50 of the second clip member 26 can contact the second side 34 of the cargo bed floor 30, or the body portion 64 of the second clip member 26 can contact the side of the cargo bed floor 30. Accordingly, the second clip member 26 enables the hitch cover assembly 12 to fit in relatively large and relatively small openings, so as to reduce or eliminate vertical movement in various different sized openings.

In one embodiment, the first clip members 24 are alternatingly disposed equidistantly with the plurality of second clip members 26 about the circumference of the axially extending wall 38. However, it is noted that any number of first or second clip members 24 and 26 can be disposed in any position on the hitch cover assembly 12 and in any order.

As shown in FIGS. 3, 4, 9, 14 and 15, the cover member 28 is configured to couple to the ring member 22 to cover the ring opening 35 formed therein. That is, the cover member 28 is configured to selectively attach to the ring member 22 to overlay the hitch opening 16 and the ring opening 35. Thus, the cover member 28 protects and covers the hitch elements 18 and 20. The cover member 28 can be generally circular with a domed or curved outer surface 67. The cover member 28 includes a plurality of cover clips 68 configured to engage the second end 46 of the axially extending wall 38 to selectively attach the cover member 28 to the ring member 22. The cover clips 68 include a longitudinal shaft member 70 that extends downwardly from the under side 72 of the cover member 28 and a clipping member 74 that projects outwardly and radially from the longitudinal shaft member 70. The clipping member 74 engages the second end 46 of the axially extending wall 38.

Figure 9:
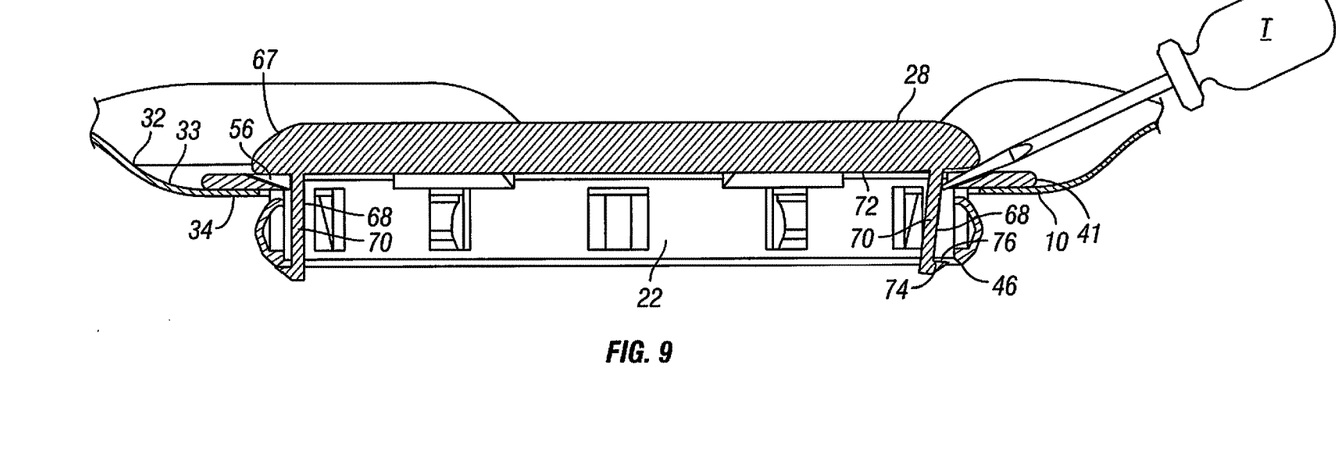
FIG. 9 is a side view in section of the cover member attached to the hitch cover assembly.

As shown in FIG. 9, when the cover member 28 is attached to the ring member 22 the cover clips 68 extend axially into the ring opening 35. The radially projecting clipping member 74 engages the inner surface 40 of the axially extending wall 38 to deflect the longitudinal shaft member 70 radially inwardly. Once the cover member 28 is moved further in the axial direction, the clipping members 74 pass the second end 46 of the axially extending wall 38 and are biased radially outward so that an upper surface 76 of the clipping member 74 moves into engagement with the second end 46 of the axially extending wall 38. The cover member 28 at this point overlies at least a part of the radial portion 41 when attached to the ring member 22. Moreover, as shown in FIGS. 1 and 9, the cover member 28 is lower than the adjacent portion of the cargo bed 10.

As illustrated in FIG. 9, the radial portion 41 defines a plurality of recesses 56 configured to receive a removal tool T (such as a screw driver). To remove the cover member 28, the tool T or other object can be inserted into one of the recesses 56 in the radial portion 41. Preferably, the cover member 28 can be rotated relative to the ring member 22 to align the cover clips 68 with the recesses 56, such that the tool can extend through the recess 56 into the ring opening, and contact the longitudinal shaft member 70 of the cover clip 68, deflecting the longitudinal shaft member 70 inwardly. This movement releases the clipping member 74 from the second end 46 of the axially extending wall 38, enabling the cover clip 68 to become disengaged and the cover member 28 to be removed from the ring member 22. It is noted that it is not necessary for the ring member 22 to include the plurality of recesses 56, and the plurality of recesses 56 can be alternatively or additionally included in the cover member 28, if desired.

The embodiments described herein enable the hitch elements disposed in a cargo bed 10 to be easily covered by the cover member 28 and accessed by removing the cover member 28 while the ring member 22 remains installed to the cargo floor 30. Moreover, the configuration of the ring member 22 enables the hitch cover assembly 12 to be disposed in openings having various diameters, and which are disposed in cargo beds having various thicknesses.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hitch cover assembly 12. Accordingly, these terms, as utilized to describe the present invention should be interpreted relative to a vehicle equipped with the hitch cover assembly 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hitch cover assembly, comprising:
   a ring member defining a ring opening and having an axially extending wall with a first end and a second end and a radial portion extending radially outward from the first end of the axially extending wall, the first end being proximal to the radial portion and the second end being distal to the radial portion, and the ring member defining a center axis parallel to the axially extending wall;
a first clip member having a body portion with a fixed end attached to the axially extending wall proximate to the second end, and a distal end adjacent the first end, spaced axially from the fixed end and spaced radially from the axially extending wall;
a second clip member having a body portion with a fixed end attached to the axially extending wall proximate the second end, and a distal end adjacent the first end, spaced axially from the fixed end and oriented to face inward toward the center axis, the second clip member being resilient so as to be capable of applying a force to a truck bed in a direction of the center axis; and
a cover member configured to selectively attach to the ring member to overlay the ring opening.

2. The hitch cover assembly according to claim 1, wherein the cover portion overlays at least a part of the radial portion when attached to the ring member.

3. The hitch cover assembly according to claim 1, wherein the axially extending wall defines a first clip opening aligned with the first clip, such that the distal end of the first clip is positionable within the first clip opening.

4. The hitch cover assembly according to claim 3, wherein the axially extending wall defines a second clip opening aligned with the second clip, such that the distal end of the second clip is positionable within the second clip opening.

5. The hitch cover assembly according to claim 1, wherein the first clip has a planar shape.

6. The hitch cover assembly according to claim 5, wherein the second clip has an arcuate shape.

7. The hitch cover assembly according to claim 1, wherein the second clip member has an arcuate shape and the first clip member is substantially straight.

8. The hitch cover assembly according to claim 1, wherein the cover member includes a plurality of cover clips configured to engage the second end of the axially extending wall to selectively attach the cover member to the ring member.

9. The hitch cover assembly according to claim 8, wherein one of the cover member and the ring member defines a plurality of recesses configured to receive a removal tool, such that with the plurality of cover clips aligned with the recesses, the cover is capable of being disengaged when the removal tool contacts one of the cover clips to disengage the cover clip from the second end of the axially extending wall.

10. The hitch cover assembly according to claim 1, wherein
the first clip is one of a plurality of first clips, and the second clip is one of a plurality of second clips, with the plurality of first clips alternatingly disposed equidistantly with the plurality of second clips about the circumference of the axially extending wall.

11. The hitch cover assembly according to claim 1, wherein
the first clip and the second clip are integrally formed with the axially extending wall.

12. A vehicle body structure, comprising:
a cargo bed having a cargo bed floor, the cargo bed floor having a first side, a second side opposite the first side, and an inner peripheral edge defining a hitch opening extending from the first side to the second side;
a hitch member aligned with the hitch opening; and
a hitch cover assembly comprising
a ring member defining a ring opening and being configured to attach to the cargo bed floor with the ring opening aligned with the hitch opening, the ring member including an axial portion disposed in the hitch opening, the axial portion including an axially extending wall with a first end positioned adjacent the first side of the cargo bed floor and a second end positioned below the second side of the cargo bed floor, the ring member defining a center axis parallel to the axially extending wall,
a first clip having a body portion with a fixed end attached to the axially extending wall proximate the second end, and a distal end spaced radially from the axially extending wall, the distal end of the first clip being positioned within the hitch opening and contacting the inner peripheral edge of the cargo bed floor to apply an outward radially directed force to the inner peripheral edge,
a second clip having a body portion with a fixed end attached to the axially extending wall proximate the second end, and a distal end spaced axially from the fixed end and oriented to face inward toward the center axis, the distal end of the second clip contacting the second side of the cargo bed floor to apply an axially directed force toward the first end of the axially extending wall, and
a cover member configured to selectively attach to the ring member to overlay the ring opening.

13. The vehicle body structure according to claim 12, wherein
the ring member includes a radial portion extending radially outward from the first end of the axially extending wall and along the first side of the cargo bed floor, with the cover portion overlaying at least a part of the radial portion when attached to the ring member.

14. The vehicle body structure according to claim 12, wherein
the cargo bed floor defines a recess, with the hitch opening disposed in the recess, and a height of the cover member is less than a depth of the recess.

15. The vehicle body structure according to claim 12, wherein
the axially extending wall defines a first clip opening aligned with the first clip, such that the distal end of the first clip is positionable within the first clip opening.

16. The vehicle body structure according to claim 15, wherein
the axially extending wall defines a second clip opening aligned with the second clip, such that the distal end of the second clip is positionable within the second clip opening.

17. The vehicle body structure according to claim 12, wherein
the first clip has a planar shape.

18. The vehicle body structure according to claim 12, wherein
the second clip has an arcuate shape.

19. The vehicle body structure according to claim 12, wherein
the cover member includes a plurality of cover clips configured to engage the second end of the axially extending wall to selectively attach the cover member to the ring member.

20. The vehicle body structure according to claim 19, wherein one of the cover member and the ring member defines a plurality of recesses configured to receive a removal tool, such that with the plurality of cover clips aligned with the recesses, the cover is capable of being disengaged when the removal tool contacts one of the cover clips to disengage the cover clip from the second end of the axially extending wall.

21. The vehicle body structure according to claim 12, wherein the first clip is one of a plurality of first clips, and the second clip is one of a plurality of second clips, with the plurality of first clips alternatingly disposed equidistantly with the plurality of second clips about the circumference of the axially extending wall.

22. The vehicle body structure according to claim 12, wherein the first clip and the second clip are integrally formed with the axially extending wall.

\* \* \* \* \*